United States Patent
Lu et al.

(10) Patent No.: US 10,687,287 B2
(45) Date of Patent: Jun. 16, 2020

(54) DYNAMIC POWER SHARING FOR DUAL CONNECTIVITY

(71) Applicant: T-Mobile USA, Inc., Bellevue, WA (US)

(72) Inventors: Kun Lu, Bellevue, WA (US); Alan Denis MacDonald, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/287,562

(22) Filed: Feb. 27, 2019

(65) Prior Publication Data

US 2020/0128494 A1    Apr. 23, 2020

Related U.S. Application Data

(60) Provisional application No. 62/749,529, filed on Oct. 23, 2018.

(51) Int. Cl.
| | | |
|---|---|---|
| *H04W 52/36* | (2009.01) | |
| *H04W 88/06* | (2009.01) | |
| *H04W 76/15* | (2018.01) | |
| *H04W 52/38* | (2009.01) | |
| *H04W 52/54* | (2009.01) | |

(52) U.S. Cl.
CPC ......... *H04W 52/38* (2013.01); *H04W 52/367* (2013.01); *H04W 52/545* (2013.01); *H04W 76/15* (2018.02); *H04W 88/06* (2013.01)

(58) Field of Classification Search
CPC .............................. H04W 52/38; H04W 76/15
See application file for complete search history.

(56) References Cited

U.S. PATENT DOCUMENTS

2017/0265150 A1   9/2017   Yang et al.
2018/0167897 A1   6/2018   Sampath et al.

FOREIGN PATENT DOCUMENTS

KR   20180008711   1/2018

OTHER PUBLICATIONS

Huawei, et. al., "Discussion on remaining issues for SUL and EN-DC", 3GPP TSG RAN, Apr. 7, 2018, See section 2.3, 6 pgs.
Nokia, et. al., "On NR dual connectivity", 3GPP TSG-RAN, Mar. 25, 2017, see section 2; and figure 2, 4 pages.
PCT Search Report and Written Opinion dated Jan. 10, 2020, for PCT Application No. PCT/US2019/052978, 9 pages.

*Primary Examiner* — Angel T Brockman
(74) *Attorney, Agent, or Firm* — Lee & Hayes, P.C.

(57) ABSTRACT

A cellular communication device is configured to use Non-Standalone Architecture (NSA) dual connectivity for communicating with a cellular communication network, using simultaneous $4^{th}$-Generation (4G) Long-Term Evolution (LTE) and $5^{th}$-Generation (5G) New Radio (NR) radio access technologies. When implementing NSA dual connectivity, the device may receive separate transmit power control commands for LTE uplink transmissions and NR uplink transmissions, respectively. In order to keep total transmitted power of the device below a regulatory maximum transmit power, LTE transmit power is limited to a value that is less than regulatory maximum transmit power, thereby reserving at least a reserved transmit power for NR transmissions. This allows NR acknowledgements to be sent from the device to avoid NR downlink failure.

20 Claims, 6 Drawing Sheets

DYNAMIC POWER SHARING FOR DUAL CONNECTIVITY

CROSS-REFERENCE TO RELATED APPLICATION

This application claims priority to a commonly owned U.S. Provisional Patent Application No. 62/749,529 filed on Oct. 23, 2018, and titled "EN_DC UL Power Limitation," which is herein incorporated by reference in its entirety.

BACKGROUND

Cellular communication devices use network radio access technologies to communicate wirelessly with geographically distributed cellular base stations. Long-Term Evolution (LTE) is an example of a widely implemented radio access technology that is used in $4^{th}$ Generation (4G) communication systems. New Radio (NR) is a newer radio access technology that is used in $5^{th}$ Generation (5G) communication systems. Standards for LTE and NR radio access technologies have been developed by the 3rd Generation Partnership Project (3GPP) for use by wireless communication carriers.

A communication protocol defined by the 3GPP, referred to as Non-Standalone Architecture (NSA), specifies the simultaneous use of LTE and NR for communications between a mobile device and a communication network. Specifically, NSA uses dual connectivity, in which a user equipment (UE) uses both an LTE uplink and an NR uplink for transmissions to corresponding 4G and 5G base stations. The LTE uplink is used for control-plane messaging and for user-plane communications. The NR uplink is used for additional user-plane bandwidth.

When using NSA, the sum of LTE and NR uplink transmit powers is legally regulated to be no greater than a regulatory maximum transmit power

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
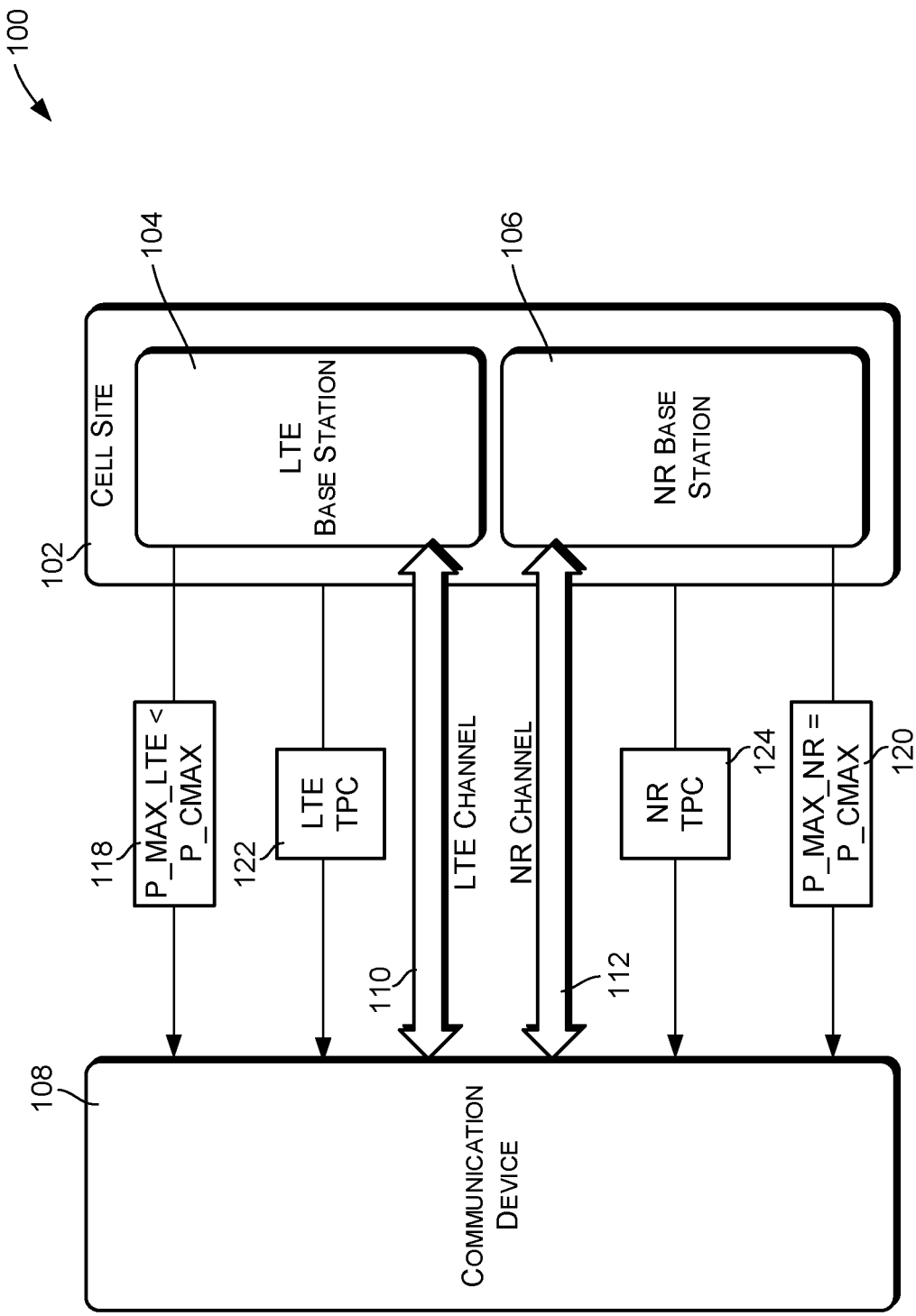
FIG. 1 is a block diagram of a cellular communication system that implements dual connectivity in conjunction with base stations of different radio access technologies.

Described herein are components and techniques for managing radio frequency (RF) transmit power of a cellular communication device that is operating in a Non-Standalone Architecture (NSA) configuration, in which communications use $4^{th}$-Generation (4G) and $5^{th}$-Generation (5G) radio access technologies. Long-Term Evolution (LTE) is an example of 4G radio access technology. New Radio (NR) is an example of 5G radio access technology.

An NSA connection uses LTE and NR communications in parallel. However, the combined power of LTE and NR transmissions by the communication device is limited a regulatory maximum transmit power, which is referred to as P_CMAX.

In certain environments, P_CMAX is 23 decibel milliwatts (dBm), which equates to 200 milliwatts. In these environments, LTE and NR transmissions can simultaneously use up to half of the available 23 dBm without causing the total transmit power of the device to exceed 23 dBm. When the communication device is at a cell edge, however, particularly when using LTE and NR RF frequencies in the 600 MHz range, it may be desirable to increase the LTE transmit power to greater than half of P_CMAX. When using dynamic power sharing, the communication device will lower its NR transmit power as necessary to achieve requested LTE transmit powers up to P_CMAX. If the LTE transmit power is increased to P_CMAX, however, there is no remaining transmit power for NR transmissions by the device, and the device may therefore be unable to respond to NR communications from the NR base station. In particular, the device will be unable to provide acknowledgements to NR downlink transmissions. The failure to respond to NR downlink communications results in failure of the NR downlink, even though the device is otherwise able to receive NR downlink signals.

The failure of the NR downlink as described above is likely to occur as the device moves toward the edge of a cell, where more device transmit power is needed to maintain primary LTE connectivity. In these situations, NR and NSA communications will be unavailable toward cell edges, and NR signal coverage will be significantly smaller than LTE signal coverage even though the device is otherwise able to receive NR base station signals.

In a described embodiment, an LTE base station is configured to instruct the communication device to use a maximum LTE transmit power of less than the regulatory maximum transmit power P_CMAX. For example, the LTE base station may configure the communication device to have a maximum LTE transmit power of 22 dBm (160 milliwatts), rather than 23 dBm (200 milliwatts). This effectively reserves at least 16 dBm (40 milliwatts) for NR transmissions. In many cases, this will be sufficient for NR downlink acknowledgements to be sent from the device to the NR base station, so that the NR downlink can continue to be used at cell edges.

The described techniques may result in larger areas of NR coverage, in which NR and LTE coverage areas are more closely matched. The described techniques allow a communication device to maintain an NR downlink at cell edges while staying within regulatory power limits, without requiring significant changes to system components, software, or firmware.

FIG. 1 illustrates relevant high-level components of a system 100 in which the described techniques may be implemented. The components shown in FIG. 1 may be used to implement dual-connectivity, for use in a Non-Standalone Architecture (NSA) configurations. When using NSA, a communication device establishes LTE and NR communication channels, and simultaneously uses both channels for communications with respective LTE and NR base stations. The LTE channel is used for control-plane messaging and for user-plane communications. The NR channel is used for additional user-plane bandwidth.

For purposes of discussion, a 4G or LTE component is a component that performs according to 4G or LTE communications standards. A 4G or LTE signal or communication is a signal or communication that accords with 4G or LTE communications standards. A 5G or NR component is a component that performs according to 5G or NR communications standards. A 5G or NR signal or communication is a signal or communication that accords with 5G or NR communications standards.

FIG. 1 shows a single cell site 102, which may be one of many such cell sites in a cellular communication network. The cell site 102 has cellular base stations to support both 4G and 5G communications. More specifically, the cell site 102 has an LTE base station 104 such as used in 4G cellular communication networks, and an NR base station 106 such as used in 5G cellular communication networks. An LTE base station is often referred to as an eNodeB. An NR base station is often referred to as a gNodeB. An eNodeB is a base station that implements 4G LTE radio access technologies. A gNodeB is a base station that implements 5G NR radio access technologies.

FIG. 1 also shows a single user equipment (UE) 108, which may be one of many such UEs that are configured for use within a cellular communication network. The UE 108 may comprise any of various types of cellular communication devices that are capable of wireless data and/or voice communications, including smartphones and other mobile devices, "Internet-of-Things" (IoT) devices, smart home devices, computers, wearable devices, entertainment devices, industrial control equipment, etc. In some environments, the UE 108 may be referred to as a mobile station (MS). For purposes of discussion, the UE 108 will be referred to at times herein as the device 108, the communication device 108, or the cellular communication device.

For NSA dual connectivity, the device 108 communicates simultaneously with the LTE base station 104 and the NR base station 106. More specifically, an LTE primary communication channel 110 is established between the device 108 and the LTE base station 104, and an NR secondary communication channel 112 is established between the device 108 and the NR base station 106. The LTE primary communication channel 110 typically comprises a communication uplink and a communication downlink. The NR secondary communication channel may comprise a communication uplink, a communication downlink, or both a communication uplink and a communication downlink.

The device 108 configures its LTE and NR radios based on configuration information supplied by and received from the LTE and NR base stations 104 and 106. The configuration information specifies a maximum LTE transmit power 118, referred to herein as P_MAX_LTE, and a maximum NR transmit power 120, referred to herein as P_MAX_NR. The configuration information is typically sent to the communication device 108 using Radio Resource Control (RRC) commands when the device 108 connects to the LTE base station 104 and when an NR communication channel is added to implement dual connectivity.

The maximum LTE transmit power 118 is the maximum power that is to be used by the LTE radio of the device 108 for LTE radio transmissions. The maximum NR transmit power 120 is the maximum power that is to be used by the NR radio of the device 108 for NR radio transmissions. Note that P_MAX_LTE may be referred to as p-MaxEUTRA in certain environments, while P_MAX_NR may be referred to as p-NR.

In a described embodiment, P_MAX_LTE is set to a value that is less than the regulatory maximum transmit power P_CMAX. This is done to reserve at least a reserved transmit power for NR radio transmissions by the device 108. The reserved transmit power equals P_MAX_NR or P_CMAX, minus P_MAX_LTE. For example, P_MAX_LTE may be specified as 21 dBm or 22 dBm. P_MAX_NR may be specified as being equal to P_CMAX.

The LTE base station 104 and the NR base station 106 operate independently and asynchronously to specify the actual transmit powers for LTE and NR radio transmissions. Each base station frequently adjusts its requested transmit power to achieve an adequate uplink signal strength from the device 108 as the device 108 moves about. More specifically, the LTE base station 104 periodically sends an LTE transmit power control (TPC) command 122, which is received and acted upon by the LTE components of the device 108. The LTE TPC command 122 specifies a requested LTE transmit power. More specifically, the LTE TPC command 122 requests either an increase or a decrease in the current LTE transmit power, based on signal quality measurements made at the LTE base station 104.

Similarly, the NR base station 106 periodically sends an NR transmit power control (TPC) command 124, which is received and acted upon by the NR components of the device 108. The NR TPC command 124 specifies a requested NR transmit power. More specifically, the NR TPC command 124 requests either an increase or a decrease in the current NR transmit power, based on signal quality measurements made at the NR base station 106.

In some embodiments, power control commands are sent to the device 108 from each of the base stations 104 and 106 at a rate of around 200 times per second or greater, reflecting variations in signal strength due to device movement and other factors.

The LTE base station 104 and the NR base station 106 may request transmit powers that each approach or are equal to P_CMAX. If implemented by the device 108, however, this would cause the total transmit power of the device 108 to exceed P_CMAX.

Upon receiving an LTE TPC command 122, the device 108 responds by adjusting its LTE transmit power up or down as commanded, subject to the limitation of P_MAX_LTE. That is, the device 108 does not increase its LTE transmit power to any value greater than P_MAX_LTE.

Upon receiving an NR TPC command 124, the device 108 responds by adjusting its NR transmit power up or down as commanded, subject to a limitation that is based on the current LTE transmit power. Specifically, the NR transmit power is limited to P_CMAX minus the current LTE transmit power, so that total transmit power of the device 108 (actual LTE transmit power plus actual NR transmit power) will be no greater than P_CMAX.

Because P_MAX_LTE is less than P_CMAX, there is always a reserved amount of power that can be used by the device 108 for NR transmissions. This allows the device to respond to downlink messages from the NR base station 106 even when the device 108 is at cell edges. The NR base station 106 is able to maintain an NR downlink because the device 108 has reserved an amount of transmit power for transmission of acknowledgements to NR downlink transmissions.

Note that although the device 108 is illustrated as communicating through a single cell site 102, it may be that in certain situations the LTE communications are through a base station of a first cell site and the NR communications are through a base station of a second, different cell site.

Figure 2:
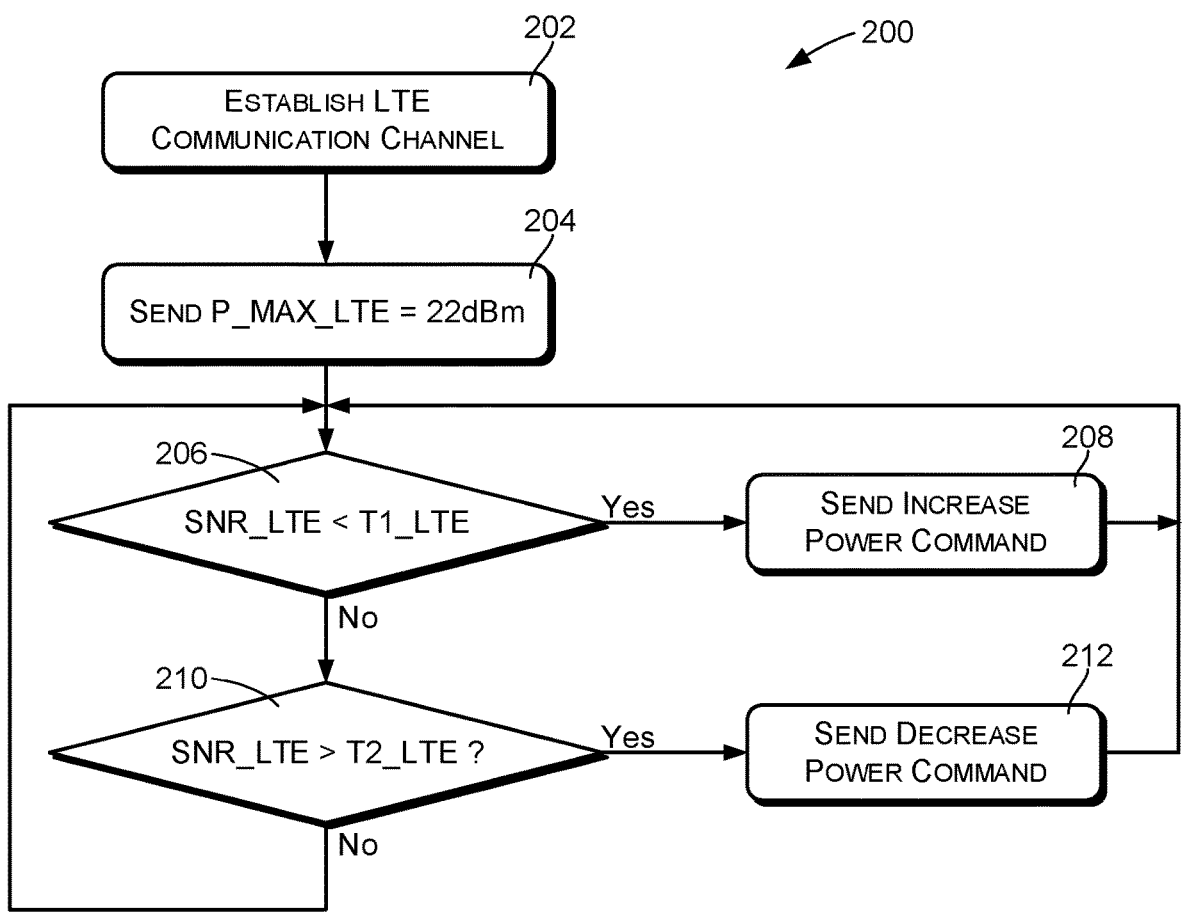
FIG. 2 is a flow diagram illustrating an example method that may be performed by a master base station for controlling device transmit power when implementing NSA dual connectivity.

FIG. 2 illustrates an example method 200 that may be performed by a primary, master base station to control transmit power of a cellular communication device when implementing dual connectivity, such as when implementing Non-Standalone Architecture (NSA) dual connectivity in a hybrid 4G/5G communication network. In the examples discussed herein, the master base station uses $4^{th}$-Generation (4G) radio access technology, such as Long-Term Evolution (LTE) radio access technology. In the described embodiment, for example, the method 200 may be performed by the LTE base station 104. Note that FIG. 2, as well as FIGS. 3-5 that follow, illustrate relevant high-level actions and communications, and that various other actions and communications may be performed in conjunction with and/or in addition to those illustrated.

An action 202 comprises establishing an LTE primary communication channel, such as the LTE communication channel 110, using an LTE radio of the communication device 108. The LTE communication channel is between the cellular communication device 108 and the LTE master base station 104.

An action 204 comprises specifying a maximum LTE transmit power to be used for LTE transmissions by the device 108. In some embodiments, the action 204 may comprise sending a maximum LTE transmit power P_MAX_LTE to the cellular communication device 108. More specifically, the action 204 comprises sending a command to the device 108, using Radio Resource Control (RRC) messaging, where the command specifies P_MAX_LTE.

P_MAX_LTE is the highest transmit power that the device 108 should use for LTE transmissions. In a described embodiment, P_MAX_LTE is set to a value that is less than P_CMAX, where P_CMAX is the regulatory maximum transmit power and the sum of the LTE transmit power and NR transmit power is not to exceed P_CMAX.

P_MAX_LTE is less than P_CMAX in order to reserve at least a reserved NR transmit power for the secondary NR communication channel 112. In some embodiments, P_MAX_LTE is set so that the reserved NR transmit power is less than or equal to 16 decibel milliwatts (dBm), which is equivalent to 40 milliwatts. In other embodiments, P_MAX_LTE may be set so that the reserved NR transmit power is greater than or equal to 16 dBm.

In one embodiment, P_MAX_LTE is at least 1 dBm less than P_CMAX. When P_CMAX equals 23 dBm, for example, P_MAX_LTE may greater than or equal to 21 dBm and less than or equal to 22 dBm.

An action 206 comprises determining whether a received LTE signal from the device 108 has a signal-to-noise ratio, referred to here as SNR_LTE, that is less than a first threshold T1_LTE. If so, an action 208 is performed of sending a transmit power control command to the device 108, instructing the device 108 to increase its LTE transmit power.

Otherwise, if SNR_LTE is not less than the first threshold T1_LTE, an action 210 is performed, which comprises determining whether SNR_LTE is greater than a second threshold T2_LTE. If so, an action 212 is performed of sending a transmit power control command to the device 108, instructing the device to decrease its LTE transmit power.

The first and second thresholds T1_LTE and T2_LTE are selected to maintain SNR_LTE within a nominal range that is high enough to provide reliable communications through the LTE communication channel 110 while also minimizing power consumption by the device 108. In practice, signal characteristics other than or in addition to signal-to-noise ratio may be evaluated when determining whether to increase or decrease LTE uplink power.

The actions starting at the action 206 are repeated periodically or continuously to repeatedly adjust the power of the LTE transmissions.

Figure 3:
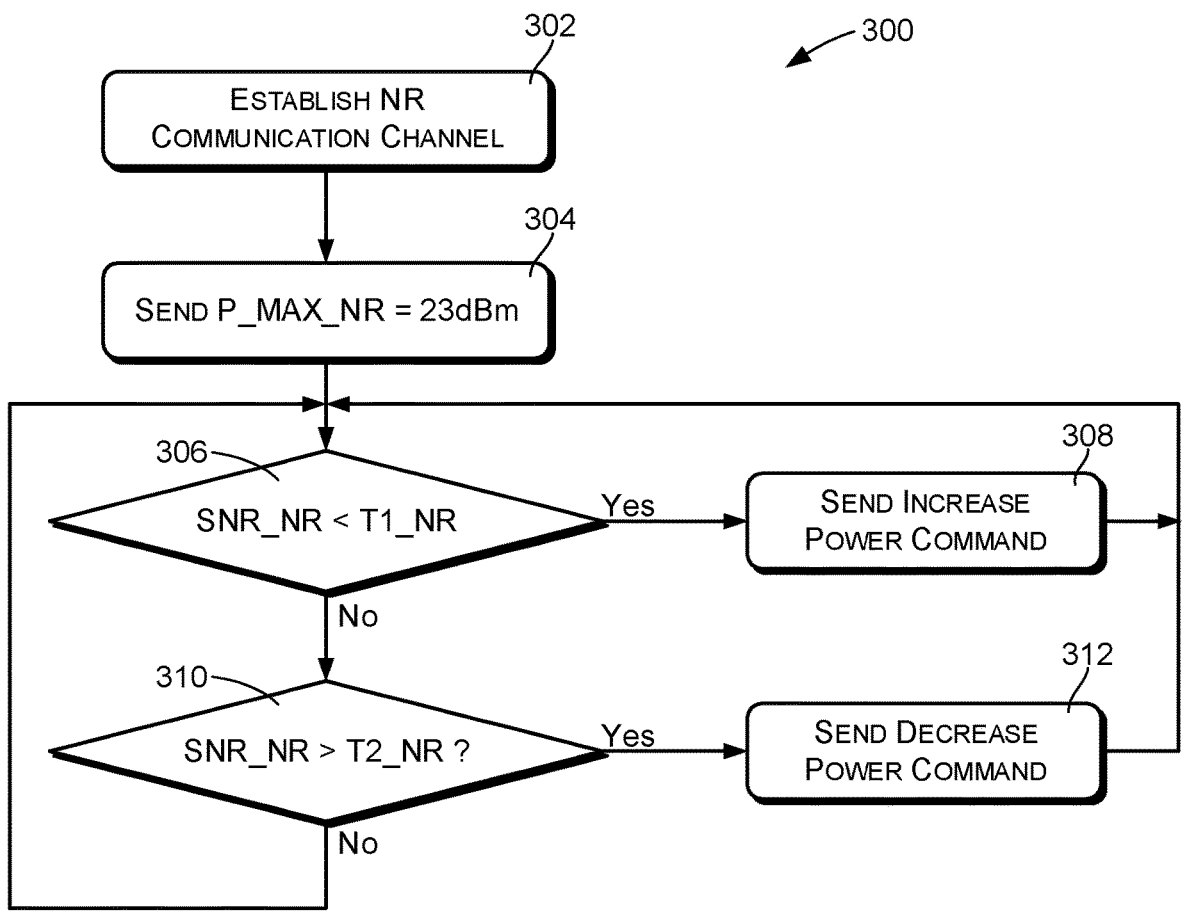
FIG. 3 is a flow diagram illustrating an example method that may be performed by a secondary base station for controlling device transmit power when implementing NSA dual connectivity.

FIG. 3 illustrates an example method 300 that may be performed by a secondary base station to control transmit power of a cellular communication device when implementing dual connectivity, such as when implementing NSA dual connectivity in a hybrid 4G/5G communication network. In the examples discussed herein, the secondary base station uses $5^{th}$-Generation (5G) radio access technology, such as New Radio (NR) radio access technology. For example, the method 300 may be performed by the NR base station 106.

An action 302 comprises establishing an NR secondary communication channel, such as the NR channel 112, using an NR radio of the communication device 108. The NR channel 112 is between the cellular communication device 108 and the NR master base station 106. The NR channel may include a communication uplink, a communication downlink, or both a communication uplink and a communication downlink.

An action 304 comprises specifying a maximum NR transmit power to be used for NR transmissions by the device 108. In some embodiments, the action 304 may comprise sending a maximum NR transmit power, referred to herein as P_MAX_NR, to the cellular communication device 108. More specifically, the action 304 may comprise sending a command to the device 108, using RRC messaging, that specifies P_MAX_NR.

P_MAX_NR is the highest transmit power that the device 108 should use for NR transmissions. In a described embodiment, P_MAX_NR is set to the regulatory maximum transmit power P_CMAX, which in some environments may be 23 dBm (200 milliwatts).

An action 306 comprises determining whether the received NR signal from the device 108 has a signal-to-noise ratio, referred to here as SNR_NR, that is less than a first threshold T1_NR. If so, an action 308 is performed of sending a transmit power control command to the device 108, instructing the device to increase its NR transmit power.

Otherwise, if SNR_NR is not less than the first threshold T1_NR, an action 310 is performed, which comprises determining whether SNR_NR is greater than a second threshold T2_NR. If so, an action 312 is performed of sending a transmit power control command to the device 108, instructing the device to decrease its NR transmit power.

The first and second thresholds T1_NR and T2_NR are selected to maintain SNR_NR within a nominal range that is high enough to provide reliable communications through the NR communication channel 112 while also minimizing power consumption by the device 108. In practice, signal characteristics other than or in addition to signal-to-noise ratio may be evaluated when determining whether to increase or decrease NR uplink power.

The actions starting at the action 306 are repeated periodically or continuously to repeatedly adjust the power of the NR uplink 112.

Figure 4:
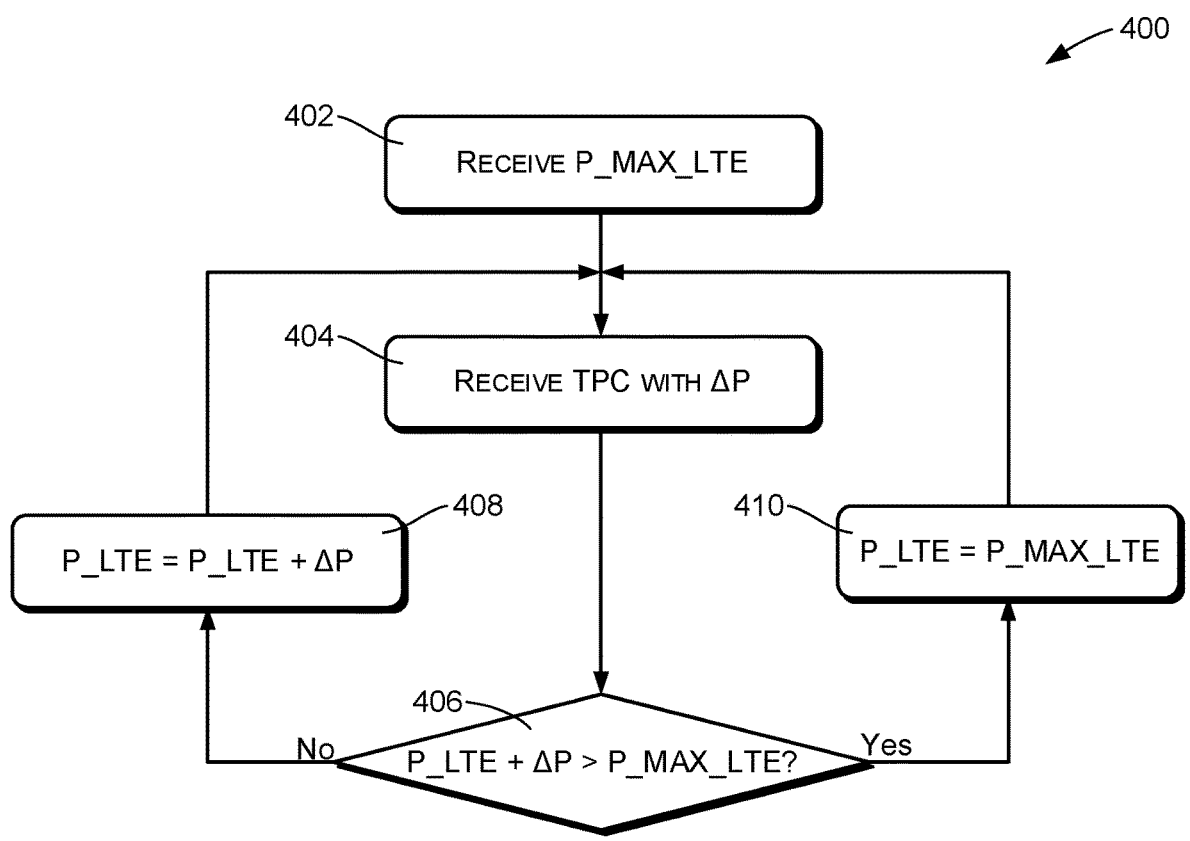
FIGS. 4 and 5 are a flow diagrams illustrating example methods that may be performed by a cellular communication device for controlling device transmit power when implementing NSA dual connectivity.

FIG. 4 illustrates an example method 400 that may be performed by a cellular communication device, such as the device 108, to set its current LTE transmit power, which is referred to herein as P_LTE.

An action 402 comprises receiving P_MAX_LTE from the LTE base station 104. An action 404 comprises receiving a transmit power command (TPC) from the LTE base station 104. The TPC may specify a requested change ΔP in the LTE transmit power P_LTE of the device 108. ΔP may be a positive value, indicating a requested increase in P_LTE, or a negative value, indicating a requested decrease in the current P_LTE.

An action 406 is then performed, which comprises determining whether the requested new LTE transmit power is greater than the maximum LTE transmit power P_MAX_LTE. Specifically, the action 406 comprises determining whether P_LTE+ΔP exceeds P_MAX_LTE. If not, an action 408 is performed of setting or changing the current LTE transmit power P_LTE to P_LTE+ΔP. Otherwise, if P_LTE+ΔP exceeds P_MAX_LTE, an action 410 is performed of setting or changing the current LTE transmit power P_LTE to P_MAX_LTE.

The actions starting at the action 404 are repeated periodically in response to receiving new TPCs from the LTE base station 104.

Figure 5:
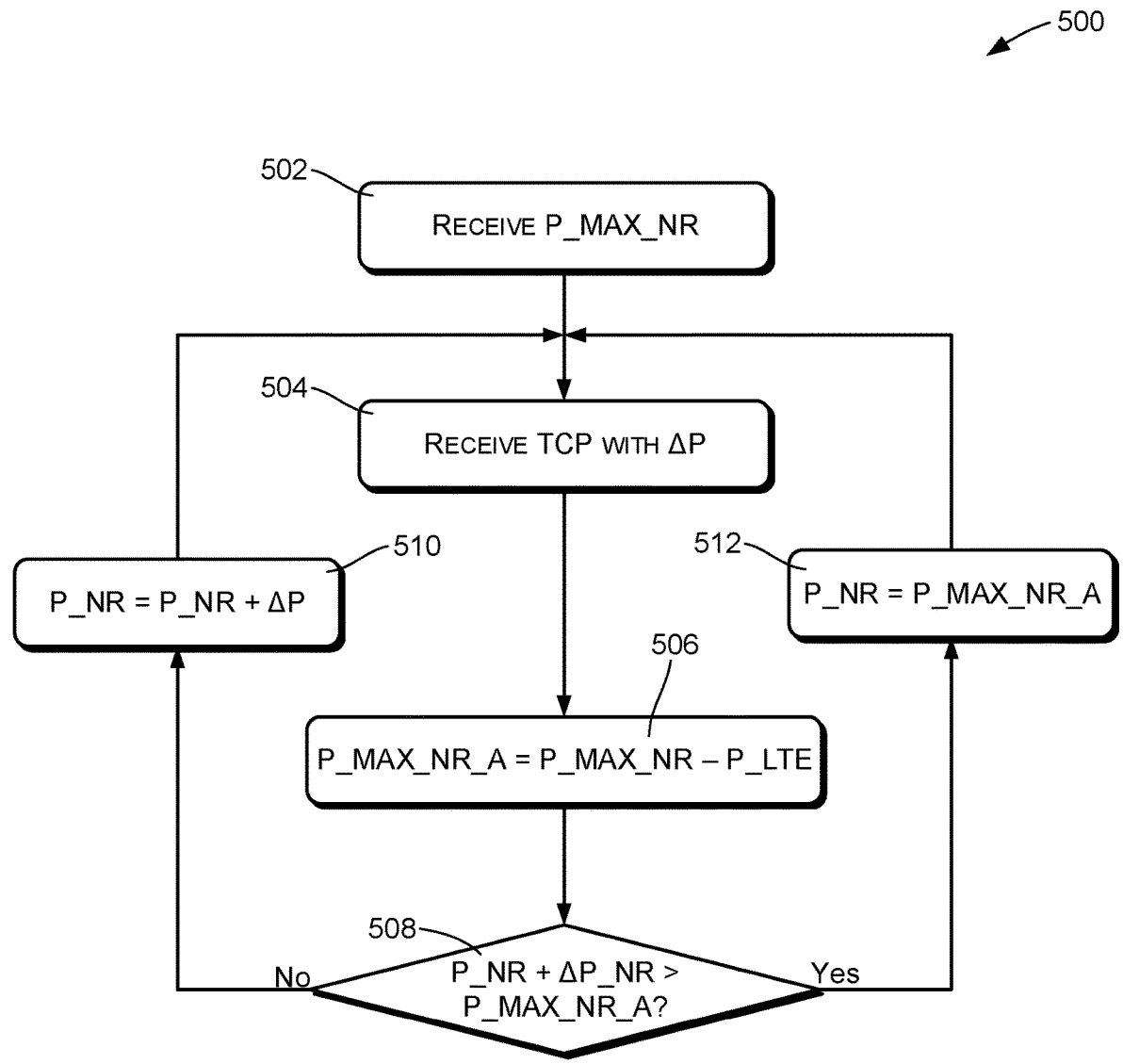

FIG. 5 illustrates an example method 500 that may be performed by a cellular communication device, such as the device 108, to set its current NR transmit power P_NR. An action 502 comprises receiving P_MAX_NR from the NR base station 106. An action 504 comprises receiving a TPC from the NR base station 106, requesting to change the current NR transmit power P_NR to a new NR transmit power. For example, the TPC may specify a requested change ΔP in the NR transmit power of the device 108. ΔP may be a positive value, indicating a requested increase in P_NR, or a negative value, indicating a requested decrease in P_NR.

Actions subsequent to the action 504 are performed in order to limit the NR transmit power P_NR to no greater than the regulatory maximum transmit power P_CMAX minus the current LTE transmit power P_LTE.

An action 506 comprises determining an adjusted maximum NR transmit power, referred to herein as P_MAX_NR_A. The adjusted maximum NR transmit power P_MAX_NR_A is calculated as the maximum NR transmit power P_MAX_NR or the regulatory maximum transmit power P_CMAX, minus the current LTE transmit power P_LTE.

An action 508 is then performed of determining whether the requested new NR transmit power is greater than the regulatory maximum transmit power P_CMAX minus the current LTE transmit power P_LTE. Specifically, the action 508 comprises determining whether P_NR+ΔP exceeds P_MAX_NR_A. If not, an action 510 is performed of setting or changing the current NR transmit power P_NR to P_NR+ΔP. Otherwise, if P_NR+ΔP exceeds P_MAX_NR_A, an action 512 is performed of setting or changing the current NR transmit power P_NR to P_MAX_NR_A.

The actions starting at the action 504 are repeated periodically in response to receiving new TPCs from the NR base station 104.

As an example illustrating the effect of the methods 400 and 500, the device 108 may receive multiple power control commands from both the LTE base station 104 and the NR base station 106. At some point, the most recently received power control commands might specify LTE and NR transmit powers having a sum greater than P_CMAX. When this happens, LTE radio transmissions are prioritized and the LTE transmit power is increased as requested, up to P_MAX_LTE, while the NR transmit power is reduced in order to keep the sum of P_LTE and P_NR at P_CMAX. Because P_LTE is limited to a value of less than P_CMAX, NR transmissions will always be allocated some minimum level of power so that the device 108 can continue to send acknowledgements to the NR base station and keep the NR communication channel alive.

Figure 6:
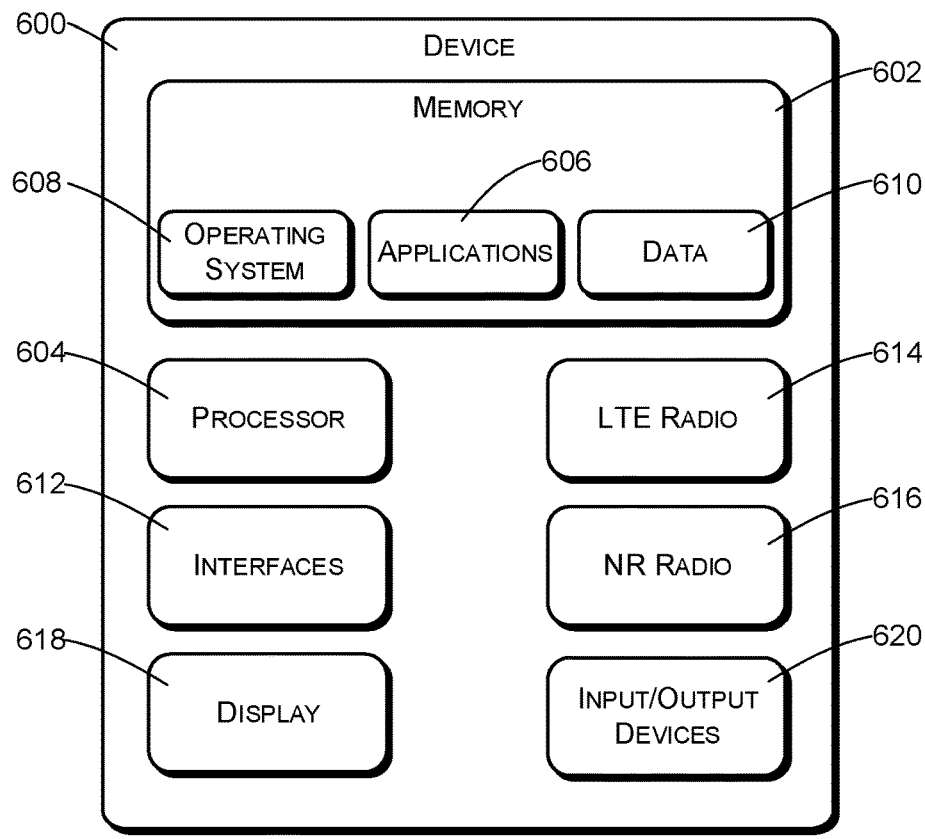
FIG. 6 is a block diagram of an example cellular communication device.

FIG. 6 illustrates high-level components of an example cellular communication device 600 that may be used to implement the techniques described herein. The device 600 is an example of a cellular communication device 108 as shown in FIG. 1. The methods 400 and 500 of FIGS. 4 and 5, for example, may be implemented by a device such as the device 600. FIG. 6 shows only basic, high-level components of the device 600.

The device 600 may include memory 602 and a processor 604. The memory 602 may include both volatile memory and non-volatile memory. The memory 602 can also be described as non-transitory computer-readable media or machine-readable storage memory, and may include removable and non-removable media implemented in any method or technology for storage of information, such as computer executable instructions, data structures, program modules, or other data. Additionally, in some embodiments the memory 602 may include a SIM (subscriber identity module), which is a removable smart card used to identify a user of the device 600 to a service provider network.

The memory 602 may include, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other tangible, physical medium which can be used to store the desired information. The memory 602 may in some cases include storage media used to transfer or distribute instructions, applications, and/or data. In some cases, the memory 602 may include data storage that is accessed remotely, such as network-attached storage that the device 600 accesses over some type of data communication network.

The memory 602 stores one or more sets of computer-executable instructions (e.g., software) such as programs that embody operating logic for implementing and/or performing desired functionality of the device 600. The instructions may also reside at least partially within the processor 604 during execution thereof by the device 600. Generally, the instructions stored in the computer-readable storage media may include various applications 606 that are executed by the processor 604, an operating system (OS) 608 that is also executed by the processor 604, and data 610.

In some embodiments, the processor(s) 604 is a central processing unit (CPU), a graphics processing unit (GPU), both CPU and GPU, or other processing unit or component known in the art. Furthermore, the processor(s) 604 may include any number of processors and/or processing cores. The processor(s) 604 is configured to retrieve and execute instructions from the memory 602.

The device 600 may have interfaces 612, which may comprise any sort of interfaces known in the art. The interfaces 612 may include any one or more of an Ethernet interface, wireless local-area network (WLAN) interface, a near field interface, a DECT chipset, or an interface for an RJ-11 or RJ-45 port. A wireless LAN interface can include a Wi-Fi interface or a Wi-Max interface, or a Bluetooth interface that performs the function of transmitting and receiving wireless communications. The near field interface can include a Bluetooth® interface or radio frequency identifier (RFID) for transmitting and receiving near field radio communications via a near field antenna. For example, the near field interface may be used for functions, as is known in the art, such as communicating directly with nearby devices that are also, for instance, Bluetooth® or RFID enabled.

The device 600 may also have an LTE radio 614 and an NR radio 616, which may be used as described above for implementing dual connectivity in conjunction with LTE and NR base stations.

The device 600 may have a display 618, which may comprise a liquid crystal display or any other type of display commonly used in telemobile devices or other portable devices. For example, the display 618 may be a touch-sensitive display screen, which may also act as an input device or keypad, such as for providing a soft-key keyboard, navigation buttons, or the like.

The device 600 may have input and output devices 620. These devices may include any sort of output devices known in the art, such as a display (already described as display 618), speakers, a vibrating mechanism, or a tactile feedback mechanism. Output devices may also include ports for one or more peripheral devices, such as headphones, peripheral speakers, or a peripheral display. Input devices may include any sort of input devices known in the art. For example, the input devices may include a microphone, a keyboard/keypad, or a touch-sensitive display (such as the touch-sensitive display screen described above). A keyboard/keypad may be a push button numeric dialing pad (such as on a typical telemobile device), a multi-key keyboard (such as a conventional QWERTY keyboard), or one or more other types of keys or buttons, and may also include a joystick-like controller and/or designated navigation buttons, or the like.

Figure 7:
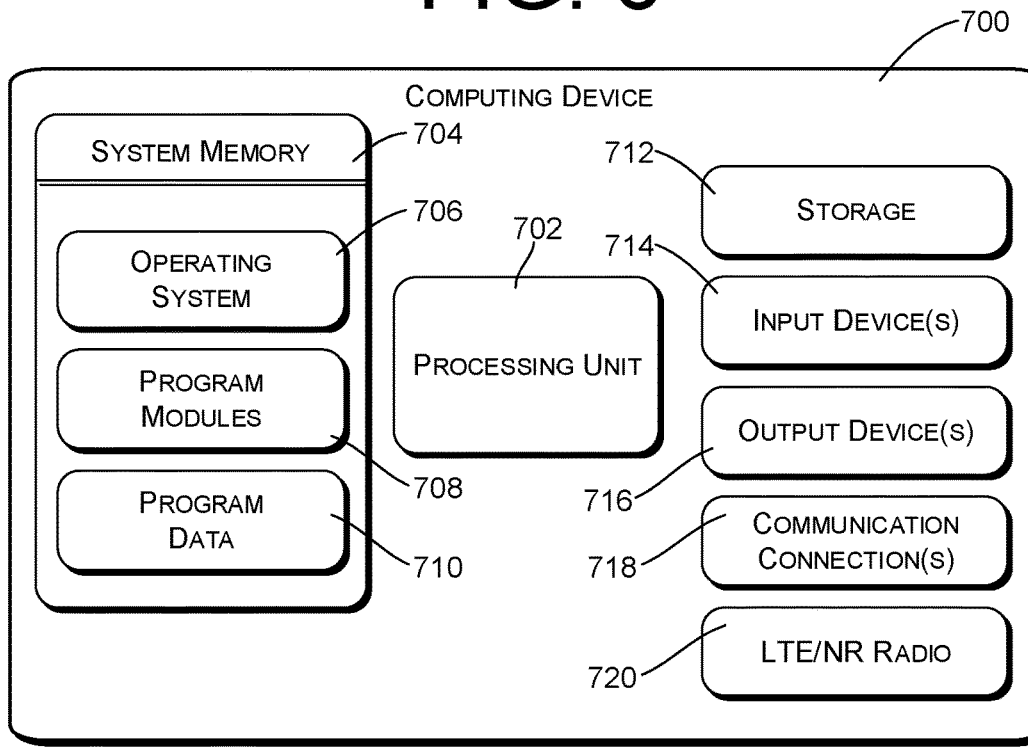
FIG. 7 is a block diagram of an example computing device that may be used to implement various functionality described herein, such as a cellular base station.

FIG. 7 is a block diagram of an illustrative computing device 700 such as may be used to implement a base station for a cellular communication network. One or more computing devices 700 may be used to implement each of the base stations 104 and 106, for example.

In various embodiments, the computing device 700 may include at least one processing unit 702 and system memory 704. Depending on the exact configuration and type of computing device, the system memory 704 may be volatile (such as RAM), non-volatile (such as ROM, flash memory, etc.) or some combination of the two. The system memory 704 may include an operating system 706, one or more program modules 708, and may include program data 710.

The computing device 700 may also include additional data storage devices (removable and/or non-removable) such as, for example, magnetic disks, optical disks, or tape. Such additional storage devices are illustrated in FIG. 7 as storage 712.

Non-transitory computer storage media of the computing device 700 may include volatile and nonvolatile, removable and non-removable media implemented in any method or technology for storage of information, such as computer readable instructions, data structures, program modules, or other data. The system memory 704 and storage 712 are all examples of computer-readable storage media. Non-transitory computer-readable storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information and which can be accessed by computing device 700. Any such non-transitory computer-readable storage media may be part of the computing device 700.

In various embodiment, any or all of the system memory 704 and storage 712 may store programming instructions which, when executed, implement some or all of the function functionality described above as being implemented by the base stations 104 and 106.

The computing device 700 may also have input device(s) 714 such as a keyboard, a mouse, a touch-sensitive display, voice input device, etc. Output device(s) 716 such as a display, speakers, a printer, etc. may also be included. The computing device 700 may also contain communication connections 718 that allow the device to communicate with other computing devices.

The computing device 700 may also include a radio 720, which may be an LTE radio or an NR radio. The radio may be used to implement wireless communications using LTE radio access technology, NR radio access technology, or other radio access technologies. In some cases, the radio 720 may be an independent device, apart from the computing device 700, that is accessible to or controlled by the computing device 700.

Although features and/or methodological acts are described above, it is to be understood that the appended claims are not necessarily limited to those features or acts. Rather, the features and acts described above are disclosed as example forms of implementing the claims.

What is claimed is:

1. A method comprising:
   establishing a primary communication channel between a cellular communication device and a first base station using a first radio access technology, wherein the cellular communication device uses a first transmit power for radio transmissions of the first radio access technology;
   establishing a secondary communication channel between a second base station and the cellular communication device, using a second radio access technology, to implement dual connectivity, wherein the cellular communication device uses a second transmit power for radio transmissions of the second radio access technology, wherein a sum of the first transmit power and the second transmit power is legally regulated to be no greater than a regulatory maximum transmit power; and
   setting a first maximum transmit power for radio transmissions of the first radio access technology by the cellular communication device, wherein the first maximum transmit power is less than the regulatory maximum transmit power to reserve a least a reserved transmit power for the transmissions of the second radio access technology, wherein the reserved transmit power equals the regulatory maximum transmit power minus the first maximum transmit power.

2. The method of claim 1, wherein:
   the secondary communication channel comprises a communication downlink; and
   the radio transmissions of the second radio access technology include acknowledgements sent to the second base station in response to transmissions of the second base station.

3. The method of claim 1, further comprising setting a second maximum transmit power for radio transmissions of the second radio access technology, wherein the second maximum transmit power equals the regulatory maximum transmit power.

4. The method of claim 1, wherein:
the regulatory maximum transmit power is 23 decibel-milliwatts (dBm); and
the first maximum transmit power is less than or equal to 22 dBm.

5. The method of claim 1, wherein the reserved transmit power is less than or equal to 16 decibel-milliwatts (dBm).

6. The method of claim 1, further comprising limiting the second transmit power to no greater than the regulatory maximum transmit power minus the first transmit power.

7. The method of claim 1, further comprising:
receiving a Long-Term Evolution (LTE) power control command to change the first transmit power to a requested LTE transmit power;
determining that the requested LTE transmit power is greater than the first maximum transmit power;
in response to determining that the requested LTE transmit power is greater than the first maximum transmit power, changing the first transmit power to the first maximum transmit power;
receiving a New Radio (NR) power control command to change the second transmit power to a requested NR transmit power;
determining that the requested NR transmit power is greater than the regulatory maximum transmit power minus the first transmit power; and
in response to determining that the requested NR transmit power is greater than the regulatory maximum minus the first transmit power, changing the second transmit power to the regulatory maximum transmit power minus the first transmit power.

8. The method of claim 1, further comprising sending a transmit power control command from the primary base station to the cellular communication device, wherein the transmit power control command requests an increase or a decrease of the first transmit power.

9. A system comprising:
a Long-Term Evolution (LTE) radio;
one or more processors;
one or more non-transitory computer-readable media storing computer-executable instructions that, when executed by the one or more processors, cause the one or more processors to perform actions comprising:
establishing an LTE primary communication channel with a cellular communication device using the LTE radio, wherein the LTE primary communication channel is used in conjunction with a secondary New Radio (NR) communication channel for Non-Standalone Architecture (NSA) dual connectivity, and wherein total transmit power of the cellular communication device is legally regulated to a regulatory maximum transmit power; and
specifying a maximum LTE transmit power to the cellular communication device, wherein the maximum LTE transmit power specified to the cellular communication device is less than the regulatory maximum transmit power to reserve at least a reserved NR transmit power for the secondary NR communication channel.

10. The system of claim 9, further comprising an NR radio, the actions further comprising:
establishing the secondary NR communication channel using the NR radio; and
specifying a maximum NR transmit power to the cellular communication device, wherein the maximum NR transmit power specified to the cellular communication device equals the regulatory maximum transmit power.

11. The system of claim 9, wherein:
the regulatory maximum transmit power is 23 decibel-milliwatts (dBm); and
the maximum LTE transmit power is less than or equal to 22 dBm.

12. The system of claim 9, wherein the reserved NR transmit power is no greater than 16 decibel-milliwatts (dBm).

13. The system of claim 9, wherein the cellular communication device uses a first transmit power for LTE transmissions and a second transmit power for NR transmissions, the actions further comprising:
receiving an LTE power control command to change the first transmit power to a requested LTE transmit power;
determining that the requested LTE transmit power is greater than the maximum LTE transmit power;
in response to determining that the requested LTE transmit power is greater than the maximum LTE transmit power, changing the first LTE transmit power to the maximum LTE transmit power;
receiving an NR power control command to change the second transmit power to a requested NR transmit power;
determining that the requested NR transmit power is greater than the regulatory maximum transmit power minus the first transmit power; and
in response to determining that the requested NR transmit power is greater than the regulatory maximum transmit power minus the first transmit power, changing the second transmit power to the regulatory maximum transmit power minus the first transmit power.

14. The system of claim 9, wherein the cellular communication device uses a first transmit power for LTE transmissions, the actions further comprising sending a transmit power control command to the cellular communication device, wherein the transmit power control command requests an increase or a decrease of the first transmit power.

15. A method comprising:
establishing a primary communication channel with a cellular communication device using a first radio access technology, wherein the cellular communication device uses a first transmit power for radio transmissions of the first radio access technology;
establishing a secondary communication channel with the cellular communication device using a second radio access technology, wherein the cellular communication device uses a second transmit power for radio transmissions of the second radio access technology, and wherein a sum of the first transmit power and the second transmit power is legally regulated to be no greater than a regulatory maximum transmit power; and
specifying a maximum transmit power for the first radio access technology, wherein the maximum transmit power is less than the regulatory maximum transmit power to reserve at least a reserved transmit power for the second radio access technology, wherein the reserved transmit power equals the regulatory maximum transmit power minus the maximum transmit power.

16. The method of claim 15, wherein the first radio access technology comprises a Long-Term Evolution radio access technology and the second radio access technology comprises a New Radio (NR) radio access technology.

17. The method of claim 15, wherein the primary communication channel and the secondary communication channel implement Non-Standalone Architecture (NSA) dual connectivity.

18. The method of claim 15, further comprising specifying a maximum transmit power for the second radio access technology to the regulatory maximum transmit power.

19. The method of claim 15, further comprising limiting the second transmit power to no greater than the regulatory maximum transmit power minus the first transmit power.

20. The method of claim 15, wherein the reserved transmit power is less than or equal to 16 decibel-milliwatts (dBm).

* * * * *